United States Patent [19]

Skow

[11] Patent Number: 4,869,443
[45] Date of Patent: Sep. 26, 1989

[54] METHOD OF EXTENDING THE PERFORMANCE OF A SPECIFIC JET AIRCRAFT

[75] Inventor: Andrew M. Skow, Rolling Hills Estates, Calif.

[73] Assignee: Eidetics International, Inc., Torrance, Calif.

[21] Appl. No.: 170,782

[22] Filed: Mar. 21, 1988

[51] Int. Cl.⁴ .............................................. B64C 3/10
[52] U.S. Cl. ................................ 244/75 R; 244/119; 244/198
[58] Field of Search ................... 244/75 R, 87, 117 R, 244/119, 125, 198, 199, 200

[56] References Cited

U.S. PATENT DOCUMENTS

| | | | |
|---|---|---|---|
| 3,744,745 | 7/1973 | Kerker et al. | 244/199 |
| 4,198,018 | 4/1980 | Brault | 244/119 |
| 4,311,289 | 1/1982 | Finch | 244/198 |
| 4,569,494 | 2/1986 | Sakata | 244/75 R |

*Primary Examiner*—Sherman D. Basinger
*Assistant Examiner*—Stephen P. Avila
*Attorney, Agent, or Firm*—Blakely, Sokoloff, Taylor & Zafman

[57] ABSTRACT

A method of extending the maneuver, performance and flight safety of a specific fighter aircraft, namely, the F-16, is disclosed. In accordance with the method, a portion of the forebody strakes on the original aircraft which extend along each side of the fuselage to the front of the cockpit are eliminated, with a small leading edge cap capping the leading edge just forward of the structural bulkhead at the aft end of the cockpit. While the method involves the removal and replacement of skin panels, access doors and various frame members adjacent the cockpit, as well as the rerouting of one or more wire bundles, no major structural changes are required, and the modification may be made utilizing ordinary maintenance and repair procedures. The net result of the modification is to shift the center of pressure which acts on the forebody aft, thereby eliminating the deep stall characteristics of the aircraft.

6 Claims, 4 Drawing Sheets

Fig. 1 Fig. 2
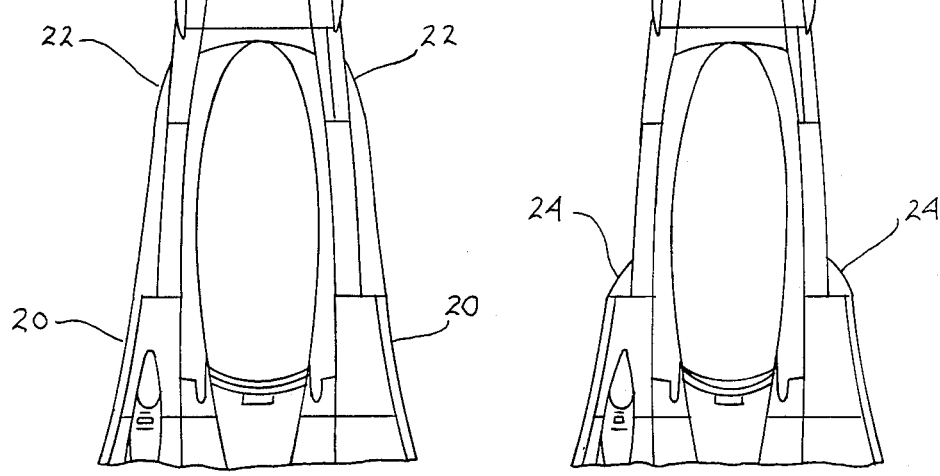
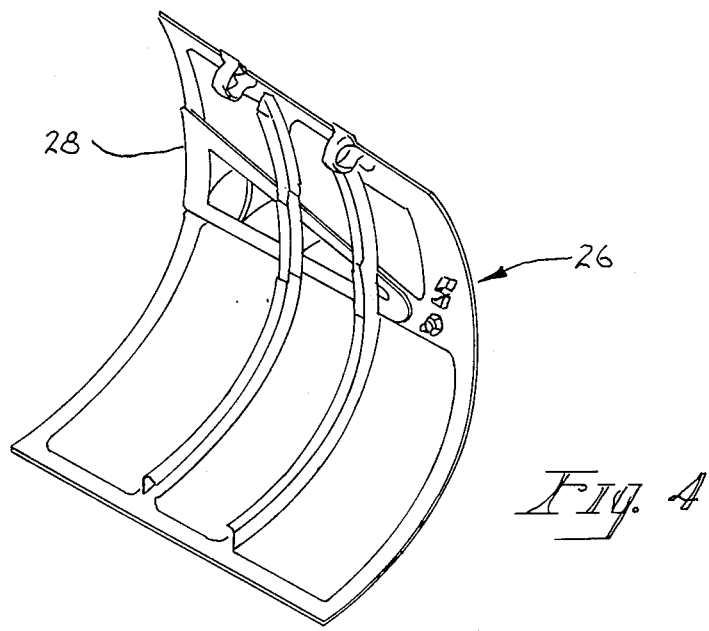
Fig. 4

METHOD OF EXTENDING THE PERFORMANCE OF A SPECIFIC JET AIRCRAFT

BACKGROUND OF THE INVENTION

1. Field of the Invention

The present invention relates to the field of aircraft maintenance, repair and modification.

2. Prior Art

The F-16 aircraft manufactured by General Dynamics is currently in use in substantial numbers by the United States and a number of other Free World countries. It is widely known that, while this aircraft is a high performance aircraft, it has a deep stall characteristic which, together with other factors, results in the flight control system being set to prevent the pilot from commanding the angle of attack to more than approximately 25 degrees. Nonetheless, it is possible to take the F-16 to higher angles of attack with dynamic maneuvering, and several aircraft are believed to have been lost to deep stalls.

The deep stall characteristics of the aircraft are caused by the fact that at an angle of attack of approximately 40 degrees, the pitching moment coefficient goes positive (meaning in the aircraft nose up direction), not going negative (meaning in the aircraft nose down direction) again until an angle attack of approximately 60 degrees is reached. Consequently, once the aircraft reaches an angle of attack in this range, the resulting nose-up pitching moment causes the aircraft to increase angle attack to approximately 60 degrees and to settle there unless appropriate procedures can successfully get the aircraft back down to normal angle of attack operating ranges. The positive pitching moment coefficient, of course, indicates that the center of lift is forward of the center of gravity, a condition which will vary somewhat dependent upon the position of the center of gravity of the aircraft at the time.

The deep stall characteristic can of course be limited if the pitching moment can always be kept negative, even in angle of attack ranges of 45 to 60 degrees. One way of doing this is to redesign the wings of the aircraft, generally enlarging the same to increase the lift aft of the center of gravity. While this is a practical approach for future production, it is not a practical modification for aircraft already in service. It is also generally recognized that had the aircraft been designed with substantially reduced size forebody strakes, the high angle of attack lift of the forward part of the fuselage would be significantly reduced, thereby keeping the center of pressure aft of the center of gravity of the aircraft and the pitching moment coefficient negative. Normally, one would consider such a modification to also be suitable only for new aircraft, and not applicable to the aircraft already in service. The present invention, however, recognizes that because of the construction of the specific aircraft in question and the extent to which the forebody strakes need to be reduced in size, such a modification may readily be made to existing aircraft, as the modification procedure involves the replacement of the appropriate non-primary structural parts of the aircraft.

BRIEF SUMMARY OF THE INVENTION

A method of extending the maneuver, performance and flight safety of a specific fighter aircraft, namely, the F-16, is disclosed. In accordance with the method, a portion of the forebody strakes on the original aircraft which extend along each side of the fuselage to the front of the cockpit are eliminated, with a small leading edge cap capping the leading edge just forward of the structural bulkhead at the aft end of the cockpit. While the method involves the removal and replacement of skin panels, access doors and various frame members adjacent the cockpit, as well as the rerouting of one or more wire bundles, no major structural changes are required, and the modification may be made utilizing ordinary maintenance and repair procedures. The net result of the modification is to shift the center of pressure which acts on the forebody aft, thereby eliminating the deep stall characteristics of the aircraft.

BRIEF DESCRIPTION OF THE DRAWINGS

FIG. 1 is a top plan view of the forward fuselage area of a current configuration F-16 illustrating the forebody strakes thereon.

FIG. 2 is a top plan view similar to FIG. 1 illustrating an F-16 fuselage after the forebody strakes have been shortened in accordance with the present invention method.

FIG. 6 is a view similar to FIG. 5 illustrating the new parts in accordance with the present invention.

DETAILED DESCRIPTION OF THE INVENTION

Figure 3:
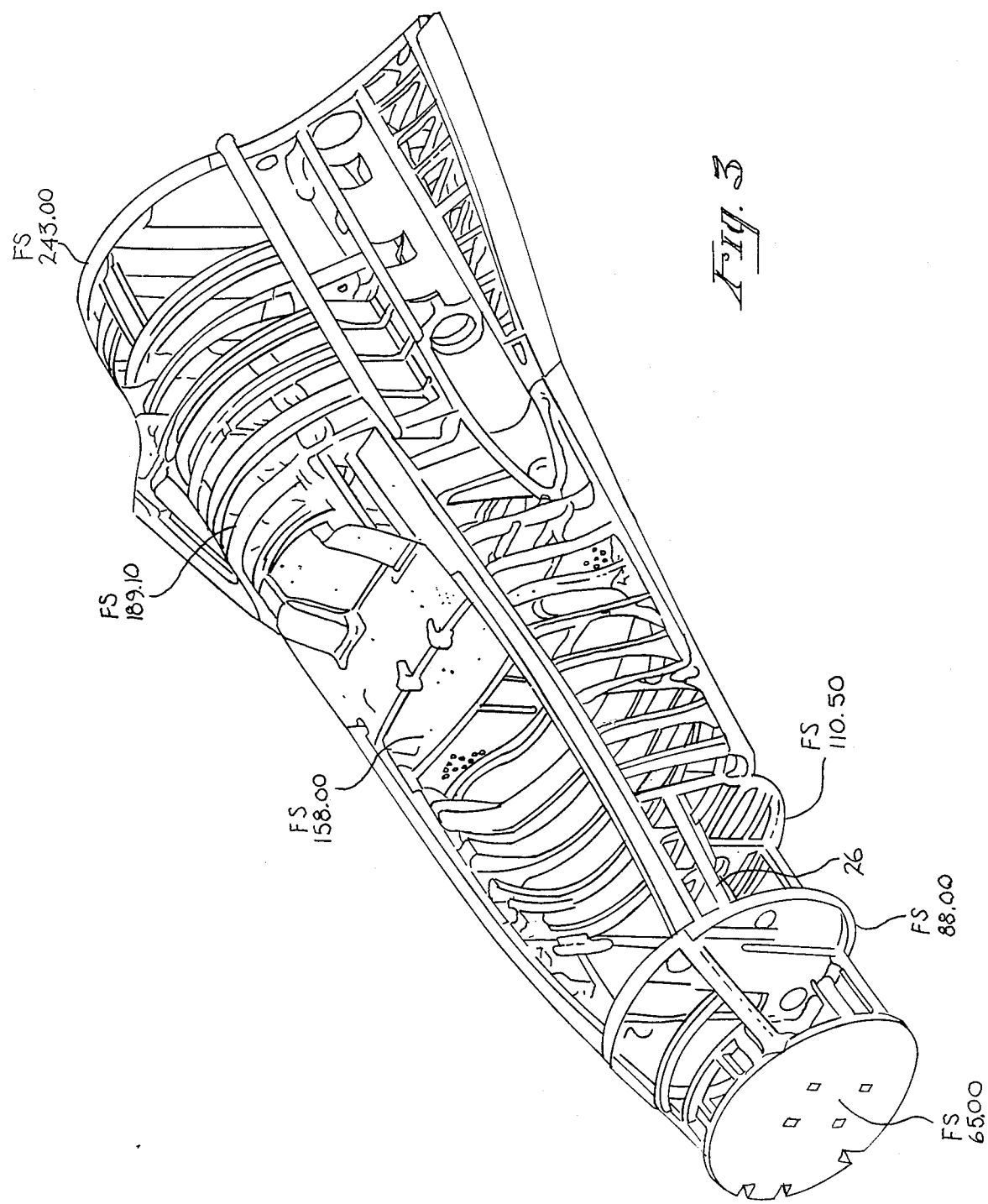
FIG. 3 is a perspective view of the structure of the F-16 fuselage region.

First referring to FIG. 1, a top plan view of the fuselage portion of the current F-16 configuration may be seen. As shown in the figure, the forward portion of the wings fair into forebody strakes 20 which extend forward along the fuselage to approximately the forward most region of the cockpit, terminating in that region at a forebody strake leading edge member attached to an access door approximately spanning fuselage stations 88 and 110.5 (see FIG. 3). These forebody strakes, in effect, increase the lift of this forward region of the fuselage at higher angles of attack, shifting the center of lift forward to result in the positive pitching moment coefficient in approximately the 40 to 60 degree angle of attack range. While this effect has been recognized, the present invention recognizes that these forebody strakes and the structure supporting the same between fuselage station 110.5 and the bulkhead at fuselage station 158 are not major structure of the aircraft, and in fact are removeable and replaceable in accordance with general techniques used for repair of damaged aircraft. In particular, as shall subsequently be seen in greater detail, the aircraft has bulkheads in this region at fuselage stations 88, 110.5 and 158, the modification of the contour of which would not appear possible on a retrofit basis. However, the present forebody strake leading edge located between fuselage stations 88 and 110.5 is not defined by either of the two bulkheads at these locations, but rather is defined by a forebody strake leading edge member forming a part of the access door assembly spanning these two bulkheads. The bulkhead at fuselage station 158, the contour of which does define the forebody strake configuration, is sufficiently aft to allow a modification which would include a new short forebody strake leading edge just forward thereof to result in sufficiently foreshortened forebody strakes to effectively eliminate the positive pitching moment coefficient in the 40 to 60 degree angle of attack range. Further, while the forebody strakes are defined by a plurality of ribs or rib-like members between fuselage stations 110.5 and 158, which ribs would not be readily modifiable to remove the forebody strake definition therefrom, such ribs are more in the form of spacers for spacing and supporting the fuselage skin with respect to the main structure, and are removeable in their entirety and replaceable with ribs defining the fuselage contour without the forebody strake protrusions. In that regard, the word skin is used herein in the general sense to include one or more skin panels, with or without access doors, access panels and the like. Upon completion of the modifications, the top plan form of the relevant portion of the fuselage will be as shown in FIG. 2, the small forebody strake leading edges 24 terminating the forebody strake, as stated before, just forward of fuselage station 158.

Now referring to FIG. 3, a perspective illustration of the fuselage structure of the F-16 from fuselage station 65 to fuselage station 243 may be seen. The bulkheads at fuselage stations 65 and 88 are both forward of the now existing fuselage forebody strakes and thus define the contour of the fuselage without forebody strakes. Fuselage station 110.5, while aft of the forward portion of the forebody strakes, still does not define the forebody strake protrusions, as the forward portion of each forebody strake is an integral part of an access door assembly which access door is hinged on longitudinal member 26 extending between the bulkheads at fuselage stations 88 and 110.5. The access door itself may be seen in FIG. 4, which in addition to conventional access door construction, includes a forebody strake leading edge member 28 supported on the access door assembly.

Figure 5:
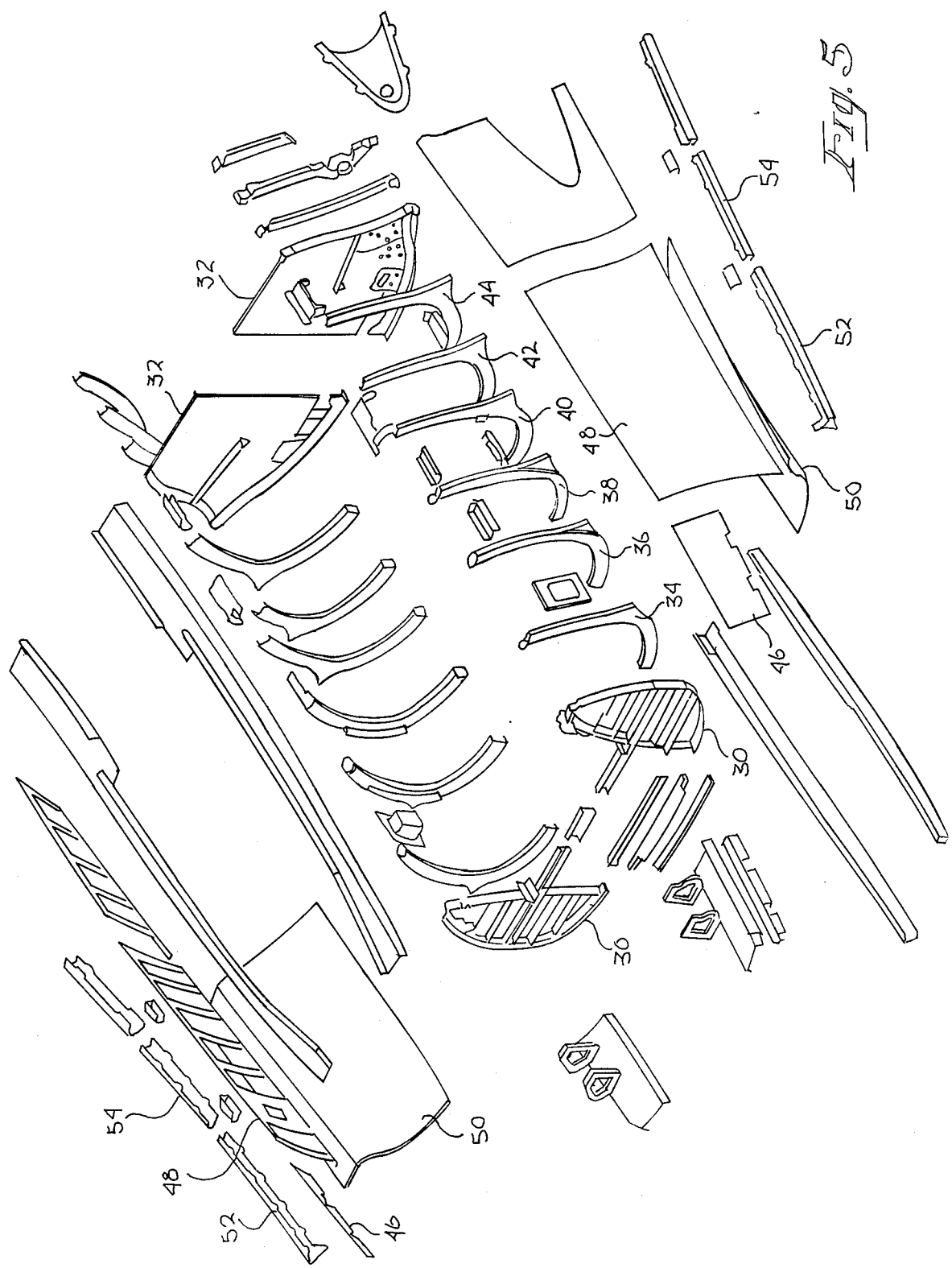
FIG. 5 is an exploded view of the forward fuselage region illustrating the parts to be changed in accordance with the present invention.

Referring now to FIG. 5, the bulkhead and rib structure between the bulkheads at fuselage station 110.5 and 158 may be seen. While the bulkhead 30 at fuselage station 110.5 does not define the forebody strake protrusion, the bulkhead 32 at fuselage station 158 clearly defines the forebody strake profile. In addition, the ribs 34, 36, 38, 40, 42 and 44 between fuselage stations 110.5 and 158 also clearly define the forebody strakes. The sheet metal itself covering this region of the fuselage comprises panels 46 above the access doors on each side of the aircraft and sheet metal panels 48 and 50 above and below forebody strake members 52 and 54.

Figure 4:
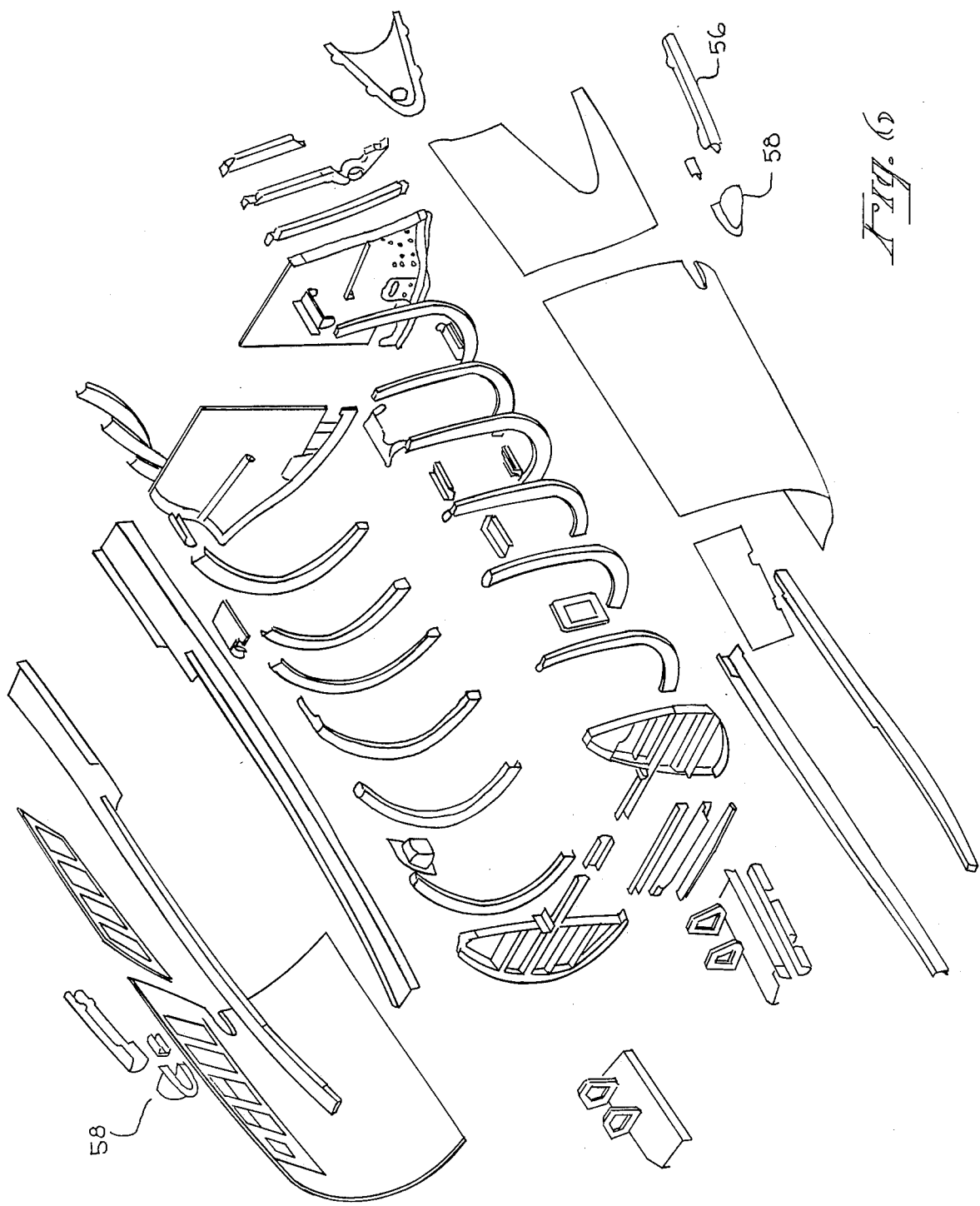
FIG. 4 is a perspective view of a typical access door for the forward fuselage region.

The actual modification would generally proceed as follows. First, the access doors (FIG. 4) and fuselage skin panels 48 and 50 would be removed. In that regard, the removal of the skin panels, while requiring care, is well within the capabilities of well trained maintenance and repair personnel. Thereafter, the six ribs or rib-like spacers 34, 36, 38, 40, 42 and 44 are removed and replaced with ribs of substantially identical design (see FIG. 6), except not defining the forebody strake projections, but rather continuing the general fuselage contour past the region in which the forebody strake projections now exist. Also, there is at least one wire bundle passing through an opening in bulkhead 32 at fuselage station 158 which is positioned within the forebody strake defining region of the bulkhead. Since the modification calls for the termination of the forebody strake just forward of that bulkhead, it is either necessary or at least advisable to reroute the wire bundle through the bulkhead at a somewhat more internal location. Thereafter, as may be seen in FIG. 6, the region previously covered by panels 48 and 50 of FIG. 5 is covered with a single panel 56 (or alternatively, multiple panels) having the general contour of the fuselage, though at the rear thereof, having a short forebody strake leading edge member 58 fastened thereto, much like the forebody strake leading edge member is currently fastened to the access door as shown in FIG. 4. Of course, if desired, the forebody strake leading edge 58 may extend to the next rib and be supported thereby, or have structure internal to the skin which effectively extends to the next rib, though since the forebody strake leading edge is a relatively small member having a substantial footprint on the skin, which itself is curved significantly in this area, it is believed that no special or extra forebody strake leading edge support is required. Also of course, any access panels, etc., previously provided in skin members 48 and 50 will be similarly provided in panel 56. Finally, of course, the access doors (FIG. 4) are replaced with access doors not having the forebody strake leading edge member 28 thereon. This may be achieved either by total replacement of the access doors with new doors, or alternatively the salvaging of the current doors by removal of the skin panel and forebody strake leading edge 28 therefrom, and the replacement of the same by an appropriate skin panel. Obviously, if desired, the single panel 56 shown in FIG. 6 may alternatively comprise two separate panels, through the use of a single panel will avoid the need for a joint therebetween.

The net result of the modification of the present invention is to reduce the amount of increase of the pitching moment coefficient at the higher angles of attack, and more particularly, to reduce the same so that the pitching moment coefficient at least remains negative throughout what is now the deep stall angle of attack range. While the pitching moment coefficient, even with the modification described herein, will still increase in this range in comparison to the low angle of attack pitching moment coefficient, thereby not providing the same degree of stability that one obtains at low angles of attack, the ability of the aircraft to bring itself out of this angle of attack range is the more important factor, as the ultimate objective is to provide safety rather than maneuverability in this angle of attack range if for some reason the pilot finds himself in this angle of attack range. Thus, by utilizing the methods of the present invention, a potentially very unsafe condition, one to which a number of aircraft losses have been attributed, is effectively eliminated. Further, an important result of the modification recognized by the inventor is that the deep stall characteristics can be eliminated without significant effect on the performance of the aircraft within its normal operating envelope.

While the preferred method of the present invention has been disclosed and described herein, it will be understood by those skilled in the art that various changes in form and detail may be made therein without departing from the spirit and scope thereof.

I claim:

1. A method of eliminating the deep stall characteristics of an F-16 aircraft having a fuselage with a fuselage skin, a cockpit, six ribs on each side of the cockpit, access doors between fuselage stations 88 and 110.5, and forebody strakes on each side of the fuselage to approximately fuselage station 110.5, comprising the steps of:

(a) removing the fuselage skin, access panels and associated forebody strakes between fuselage stations 110.5 and 158;

(b) removing the six ribs on each side of the cockpit between the bulkheads at fuselage station 110.5 and 158, and replacing the same with equivalent replacement ribs having the same fuselage contour as those removed, the replacement ribs containing the same fuselage contour and without defining any forebody strakes in the fuselage region where the forebody strakes had been;

(c) removing the access doors between fuselage stations 88 and 110.5 containing the forebody strake leading edge and replacing the same with access doors continuing the fuselage contour over the area where the forebody strake leading edge had been;

(d) replacing the fuselage skin, access doors and forebody strakes between fuselage station 110.5 and 158 with fuselage skin and access doors contoured to the replacement ribs and with a forebody strake leading edge between the bulkhead at fuselage station 158 and the rib immediately forward thereof.

2. The method of claim 1 wherein the step (d), the forebody strake leading edge is substantially a continuation of the cross section of the adjacent wing leading edge.

3. The method of claim 1 wherein in step (d), the replacement leading edge forebody strake is supported on the adjacent fuselage skin.

4. The method of claim 1 wherein in step (d), the replacement skin from fuselage station 110.5 aft at least a plurality of ribs is a single piece of sheet metal on each side of the fuselage.

5. The method of claim 1 further including the step of rerouting at least one wire bundle passing through the bulkhead at fuselage station 158 near the outer edge thereof to a location further spaced inward from the outer edge thereof.

6. A method of eliminating the deep stall characteristics of an F-16 aircraft having a fuselage with a fuselage skin, a cockpit, six ribs on each side of the cockpit, access doors between fuselage stations 88 and 110.5, and forebody strakes on each side of the fuselage to approximately fuselage station 110.5, comprising the steps of:

(a) removing the fuselage skin, access panels and associated forebody strakes between fuselage stations 110.5 and 158;

(b) removing the six ribs on each side of the cockpit between the bulkheads at fuselage stations 110.5 and 158, and replacing the same with equivalent replacement ribs having the same fuselage contour as those removed, the replacement ribs containing the same fuselage contour and without defining any forebody strakes in the fuselage region where the forebody strakes had been;

(c) removing the access doors between fuselage stations 88 and 110.5 containing the forebody strake leading edge and replacing the same with access doors continuing the fuselage contour over the area where the forebody strake leading edge had been;

(d) rerouting at least one wire bundle passing through the bulkhead at fuselage station 158 near the outer edge thereof, to a location further spaced inward from the outer edge thereof; and, (e) replacing the fuselage skin, access doors and forebody strakes between fuselage station 110.5 and 158 with fuselage skin and access doors contoured to the replacement ribs and with a forebody strake leading edge between the bulkhead at fuselage station 158 and the rib immediately forward thereof, the forebody strake defining a continuation of the cross section of the adjacent wing leading edge and being supported on the adjacent replacement fuselage skin.

* * * * *